United States Patent [19]
Hata et al.

[11] Patent Number: 5,995,360
[45] Date of Patent: Nov. 30, 1999

[54] MONOLITHIC CERAMIC CAPACITOR

[75] Inventors: Kotaro Hata; Harunobu Sano, both of Kyoto, Japan

[73] Assignee: Murata Manufacturing Co., Ltd., Japan

[21] Appl. No.: 09/018,156

[22] Filed: Feb. 3, 1998

[30] Foreign Application Priority Data

Feb. 7, 1997 [JP] Japan ..................................... 9-025125

[51] Int. Cl.$^6$ ............................. H01G 4/06; H01G 4/228; H01G 4/20
[52] U.S. Cl. ..................................... 361/321.5; 361/321.4; 361/306.3; 361/313; 361/309; 501/134; 501/137
[58] Field of Search ................................. 361/301.1, 311, 361/312, 320, 321.1–321.5; 501/134, 135, 136, 137, 138, 139

[56] References Cited

U.S. PATENT DOCUMENTS

| | | | |
|---|---|---|---|
| 5,731,950 | 3/1998 | Sakamoto et al. | 361/321.4 |
| 5,742,473 | 4/1998 | Sano et al. | 361/321.4 |
| 5,801,111 | 9/1998 | Wada et al. | 361/321.2 |
| 5,815,368 | 9/1998 | Sakamoto et al. | 361/321.4 |
| 5,822,176 | 10/1998 | Sano et al. | 361/321.4 |
| 5,835,340 | 10/1998 | Wada et al. | 361/321.4 |
| 5,862,034 | 1/1999 | Sato et al. | 361/321.5 |

*Primary Examiner*—Kristine Kincaid
*Assistant Examiner*—Eric W. Thomas
*Attorney, Agent, or Firm*—Ostrolenk, Faber, Gerb & Soffen, LLP

[57] ABSTRACT

A monolithic ceramic capacitor composed of laminated plural dielectric ceramic layers, internal electrodes disposed between the dielectric ceramic layers and external electrodes formed at both the edge surfaces of the dielectric ceramic layers such that they are alternately connected to the internal electrodes, wherein the dielectric ceramic layers are composed of a material comprising principal components shown by the formula: $(1-\alpha-\beta)\{BaO\}_m \cdot TiO_2 + \alpha\{(1-x)M_2O_3 + xRe_2O_3\} + \beta(Mn_{1-y-z}Ni_yCo_z)O$ (wherein $M_2O_3$ is at least one of $Sc_2O_3$ and $Y_2O_3$; $Re_2O_3$ is at least one of $Gd_2O_3$, $Tb_2O_3$ and $DY_2O_3$; $0.0025 \leq \alpha \leq 0.025$, $0.0025 \leq \beta \leq 0.05$, $\beta/\alpha \leq 4$, $0 < x \leq 0.50$, $0 \leq y < 1.0$, $0 \leq z < 1.0$, $0 \leq y+z \leq 1.0$, and $1.000 < m \leq 1,035$), and containing definite amounts of MgO and $SiO_2$ as side components.

15 Claims, 2 Drawing Sheets

MONOLITHIC CERAMIC CAPACITOR

FIELD OF THE INVENTION

The present invention relates to a ceramic capacitor used for electronic equipment, and more particularly to a monolithic ceramic capacitor having an internal electrode made of nickel or a nickel alloy.

BACKGROUND OF THE INVENTION

A process of producing a monolithic ceramic capacitor is generally as follows. First, a dielectric ceramic sheet is prepared. Then, an electrode material for an internal electrode is disposed on the sheet. The dielectric ceramic material, for example, includes $BaTiO_3$ as the main component. Next, a plurality of the dielectric ceramic sheets are laminated. The laminated sheets are pressed with heating to form a laminated body and the laminated body are fired in air at 1250 to 1350° C. Finally, external electrodes applied on the edge surface of the laminated body to connect to the internal electrodes.

Accordingly, the material of the internal electrode is required to meet to following conditions.

(a) Because the dielectric ceramic and the internal electrodes are simultaneously fired, the internal electrode preferably has a melting point same as or higher than firing temperature of the dielectric ceramic.

(b) The material is not oxidized even in an oxidative high-temperature atmosphere and does not react with the dielectric ceramic.

As the electrodes meeting such conditions, a noble metal or the alloy thereof, such as platinum, gold, palladium, a silver-palladium alloy and the like has been used. Although these electrode materials have excellent characteristics, they are expensive. Thus, the amount of the electrode material cost of the monolithic ceramic capacitor becomes from 30 to 70% and becomes the largest factor increasing the production cost of monolithic ceramic capacitors.

Other materials having high melting points than the noble metals include such base metals as Ni, Fe, Co, W, Mo and the like but these base metals are easily oxidized in a high-temperate oxidative atmosphere, whereby they become unusable as electrodes. Accordingly, to use these base metals as the internal electrodes of a monolithic ceramic capacitor, it is necessary to fire the base metal together with a dielectric ceramic in a neutral or reductive atmosphere. However, when conventional dielectric ceramic materials are fired in such a neutral or reducing atmosphere, they are greatly reduced and become semi-conductive.

To overcome this problem, there are proposed, for example, a dielectric ceramic material wherein the barium site/titanium site ratio is in excess of the stoichiometric ratio in a barium titanate solid solution as shown in JP-B-57-42588 and a dielectric ceramic material made up of a barium titanate solid solution combined with an oxide of a rare earth element such as La, Nd, Sm, Dy, Y, etc., as shown in JP-A-61-101459.

Also, as a dielectric ceramic material having a small temperature dependence of the dielectric constant, there are proposed, for example, a dielectric ceramic material of a $BaTiO_3$—$CaZrO_3$—$MnO$—$MgO$ system composition as shown in JP-A-62-256422 and a dielectric ceramic material of a $BaTiO_3$—(Mg, Zn, Sr, Ca)O—$B_2O_3$—$SiO_2$ system composition as shown in JP-B-61-14611.

By using such a dielectric ceramic material as described above, a dielectric ceramic which does not become a semi-conductive material even when the material is fired in a reducing atmosphere and the production of a monolithic ceramic capacitor using a base metal such as nickel and the like as the internal electrodes becomes possible.

With the recent developments in electronics, miniatualizing of electronic parts has quickly proceeded and the tendency to small-sizing and increasing the capacity of monolithic ceramic capacitors also is remarkable. Thus, the increase of the dielectric constant of a dielectric ceramic material and thinning of a dielectric ceramic layer have proceeded very quickly. Accordingly, the demand for a dielectric ceramic material having a high dielectric constant, showing a small temperature change of the dielectric constant, and being excellent in reliability has become large.

However, the dielectric ceramic materials shown in JP-B-57-42588 and JP-A-61-101459 give a large dielectric constant but have the faults that the crystal grains of the dielectric ceramic obtained become large, so that when the thickness of the dielectric ceramic layer in the monolithic ceramic capacitor becomes as thin as 10 µm or thinner, the number of the crystal grains existing in one layer is reduced, and the reliability is lowered. Furthermore, there is also a problem in the dielectric ceramic materials, in that the temperature change of the dielectric constant is large. Thus, the above-described dielectric ceramic materials cannot meet the requirements of the market.

Also, in the dielectric ceramic material shown in JP-A-62-256422, the dielectric constant is relatively high, the crystal grains of the dielectric ceramic obtained are small, and the temperature change of the dielectric constant is small but because $CaZrO_3$ and also $CaTiO_3$ formed in the firing process are liable to form a secondary phase with MnO, etc., there is a problem in reliability at a high temperature.

Furthermore, in the dielectric ceramic material shown in JP-B-61-14611, there are faults that the dielectric constant of the dielectric ceramic obtained is from 2,000 to 2,800 and that the material is disadvantageous from the view point of small-sizing and increasing the capacity of the monolithic ceramic capacitor. Also, there is a problem in that the dielectric ceramic material cannot satisfy the X7R characteristics prescribed by the EIA standard, that is, the characteristics that the changing ratio of the electrostatic capacity is within ±15% in the temperature range of from −55° C. to +125° C.

Also, various improvements in the anti-reducing dielectric ceramics proposed heretofore have been made on preventing deterioration of the insulating resistance in a high-temperature loading life test but the deterioration of the insulating resistance in a moisture loading test has not been so improved.

Thus, to solve the above-described problems, various components are proposed in JP-A-5-9066, JP-A-5-9067, and JP-A-5-9068. However, because of the requirement for further small-sizing and further increasing the capacity, the requirements of market for thinning the thickness of a dielectric ceramic layer and reliability have become more severe and the requirement for a dielectric ceramic material having better reliability and coping with thinning the layer thickness has increased. Accordingly, the necessary for providing a small-sized and large capacity monolithic ceramic capacitor excellent in the reliability characteristics under high temperature and high humidity has occurred.

SUMMARY OF THE INVENTION

Thus, a primary object of the present invention is to provide a low-cost, small-sized, and large-capacity monolithic ceramic capacitor having excellent weather resistance performance, such as high-temperature loading, moisture loading, etc., wherein the dielectric constant is at least 3,000;

when the insulating resistance is shown by the product with the electrostatic capacity (CR product), the insulating resistance is high as 6,000 MΩ·μF or higher; and the temperature characteristics of the electrostatic capacity satisfy the B characteristics prescribed by the JIS standard and satisfy the X7R characteristics prescribed by the EIA standard.

It has now been discovered that the above-described object can be achieved by the present invention as described hereinbelow.

That is, a first aspect of the present invention is a monolithic ceramic capacitor comprising a pair of electrodes, dielectric ceramic layers and internal electrodes between the layers wherein the dielectric ceramic layer includes a material comprising barium titanate containing alkali metal oxides as impurities in amounts of not more than about 0.02% by weight, at least one oxide selected from scandium oxide and yttrium oxide, at least one oxide selected from gadolinium oxide, terbium oxide and dysprosium oxide, and at least one mixed oxide of manganese, cobalt oxide and nickel; and further containing magnesium oxide in an amount of from about 0.3 to 5.0 mols calculated as MgO and silicon oxide in an amount of from about 0.2 to 5.0 mols converted as $SiO_2$ as side components per 100 mols of the principal component represented by the following component formula: $(1-\alpha-0)\{BaO\}m\cdot TiO_2+\alpha\{(1-x)M_2O_3+xRe_2O_3\}+\beta(Mn_{1-y-z}Co_z)O$ (wherein $M_2O_3$ is at least one of $Sc_2O_3$ and $Y_2O_3$; $Re_2O_3$ is at least one of $Gd_2O_3$, $Tb_2O_3$ and $Dy_2O_3$; and $\alpha$, $\beta$, m, x, y, and z are $0.0025 \leq \alpha \leq 0.025$, $0.0025 \leq \beta \leq 0.05$, $\beta/\alpha \leq 4$, $0 < x \leq 0.50$, $0 \leq y < 1.0$, $0 \leq z < 1.0$, $0 \leq y+z < 1.0$, and $1.000 < m \leq 1.035$). The internal electrodes may be composed of nickel or a nickel alloy.

Preferably, the impurity is less than about 0.012%, $0.007 \leq \alpha \leq 0.02$, $0.005 \leq \beta \leq 0.03$, $\beta/\alpha \leq 2.5$, $0.2 \leq x \leq 0.4$, $0.1 \leq 0.5$, $0.2 \leq z \leq 0.3$, $0.3 \leq y+z \leq 0.7$, and $1.005 \leq m \leq 1.03$, and the number of mols of MgO and $SiO_2$ per 100 are about 0.5–4 and 0.9–3.5, respectively. Also preferably, M includes Y and Re includes Dy.

A second aspect of the present invention is a monolithic ceramic capacitor of the first aspect wherein the above-described external electrodes are composed of a sintered layer of an electrically conductive metal powder or an electrically conductive metal powder combined with a glass frit.

A third aspect of the present invention is a monolithic ceramic capacitor of the first aspect wherein the above-described external electrodes are composed of a first layer made up of a sintered layer of an electrically conductive metal powder or an electrically conductive metal powder and glass frit and a second layer made up of a plating layer formed on the first layer.

DETAILED DESCRIPTION OF THE INVENTION

Figure 1:
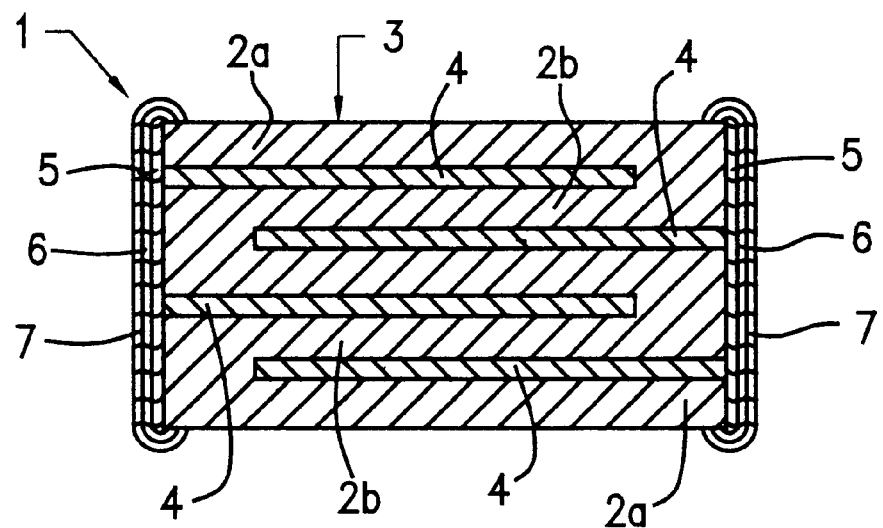
FIG. 1 is a schematic cross-sectional view showing an embodiment of the monolithic ceramic capacitor of the present invention.

The present invention is described in detail below.

In the present invention, by using a dielectric ceramic material comprising barium titanate, at least one oxide selected from scandium oxide and yttrium oxide; at least one oxide selected from gadolinium oxide, terbium oxide and dysprosium oxide; and at least one oxide selected from manganese oxide, cobalt oxide and nickel oxide adjusted in the above-described component ratio and combined with magnesium oxide and silicon oxide as the material of the dielectric ceramic layer, a monolithic ceramic capacitor which can be fired without deteriorating the characteristics thereof even when it is fired in a reducing atmosphere, has the temperature characteristics of the electrostatic capacity of which satisfy the B characteristics prescribed by the JIS standard and the X7R characteristics prescribed by the ETA standard, and which has a high insulating resistance at room temperature and high temperature under a high field strength and also has high reliability can be obtained.

Also, because the crystal grain sizes of the dielectric ceramic layers obtained are small as 1 μm or smaller, the number of the crystal grains existing in each dielectric ceramic layer can be increased, whereby even when the thickness of each dielectric ceramic layer of the monolithic ceramic capacitor is thinned, lowering of the reliability can be prevented.

Also, it has been confirmed that in the principal components of the dielectric ceramic material of the dielectric ceramic layer composed of barium titanate, at least one rare earth metal oxide selected from scandium oxide and yttrium oxide, at least one rare earth metal oxide selected from gadolinium oxide, terbium oxide and dysprosium oxide, and at least one oxide selected from manganese oxide, cobalt oxide and nickel oxide; in the barium titanate, there slightly exist alkaline earth metal oxides such as SrO, CaO, etc., alkali metal oxides such as $Na_2O$, $K_2O$, etc., and other oxides such as $Al_2O_3$, $SiO_2$, etc., as impurities. Of these impurities, the content of particularly the alkali metal oxides such as $Na_2O$, $K_2O$, etc., have a large influence on the electric characteristics of the monolithic ceramic capacitor. That is, it has been confirmed that by using barium titanate wherein the contents of the alkali metal oxides existing therein as impurities are less than about 0.02% by weight, a dielectric constant of 3,000 or higher is obtained.

Furthermore, it has been confirmed that with silicon oxide in the dielectric ceramic layer during the relatively high-temperature state of calcining and controlling the calcining atmosphere to an oxygen partial pressure near the equilibrium oxygen partial pressure of Ni/NiO, the sintering property is improved and also the moisture loading characteristics are improved.

When a dielectric ceramic layer is formed using the dielectric ceramic material as described above, a small-sized and large capacity monolithic ceramic capacitor showing less temperature change of the electrostatic capacity and having a high reliability can be realized and also it becomes possible to use nickel or a nickel alloy, possibly with a small amount of a ceramic powder, as the internal electrodes.

Also, there is no particular restriction on the composition of the external electrodes. For example, the external electrode may by composed of, for example, a sintered layer of various electrically conductive metal powders such as Ag, Pd, Ag-Pd, Cu,Cu alloys, etc., or a sintered layer of the above-described electrically conductive metal powder and various glass frits such as a $B_2O_3$—$Li_2O$—$SiO_2$—$BaO$ series glass frit, a $B_2O_3$—$SiO_2$—$BaO$ series glass frit, a $B_2O_3$—$SiO_2$—$ZnO$ series glass frit, an $Li_2O$—$SiO_2$—$BaO$ series glass frit, etc. Also, a small amount of a ceramic powder may be combined with the electrically conductive metal powder and the glass frit. More preferably, a plating layer is formed on the sintered layer and the plating layer may be a plating layer of Ni, Cu, an Ni—Cu alloy, etc., or the plating may further have thereon a plating layer of a soft solder, tin, etc.

The present invention is described more practically based on the embodiment of the invention hereinafter but the invention is not limited to the embodiment.

Figure 2:
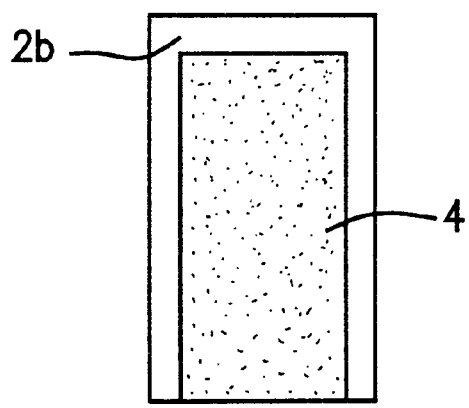
FIG. 2 is a schematic plane view showing a dielectric ceramic layer having an internal electrode as an embodiment of the present invention.
Figure 3:
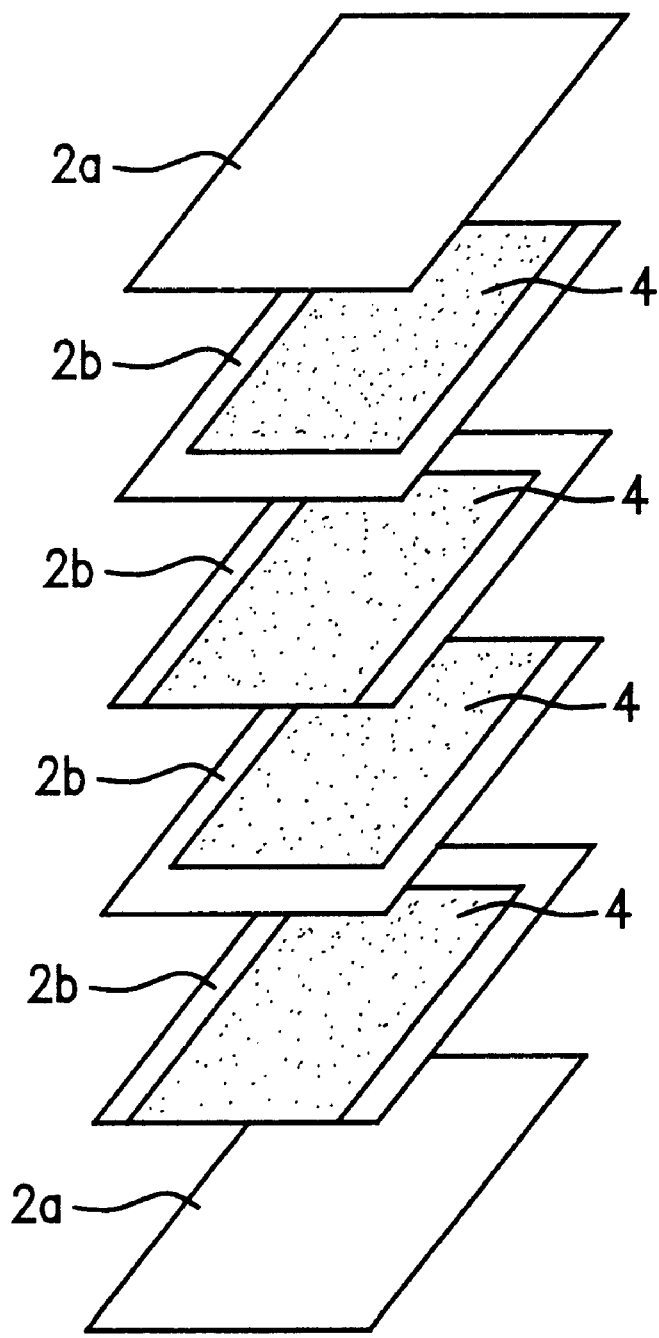
FIG. 3 is an exploded view showing an embodiment of the ceramic laminate of the present invention.

An embodiment of the monolithic ceramic capacitor of the present invention is explained. FIG. 1 is a schematic cross-sectional view showing an embodiment of the monolithic ceramic capacitor of the present invention, FIG. 2 is a schematic plane view showing a dielectric ceramic layer having an internal electrode as an embodiment of the present invention, and FIG. 3 is an exploded view of an embodiment of the ceramic laminate of the present invention.

As shown in FIG. 1, the monolithic ceramic capacitor 1 is a rectangular chip-type capacitor composed of a ceramic laminate 3 obtained by laminating plural dielectric ceramic layers 2a, 2b each having an internal electrode 4, and forming external electrodes 5 at both edge surfaces, the external electrodes having a first plating layer 6 of nickel, copper, etc., and a second plating layer 7 of a soft solder, tin, etc.

The production method of the monolithic ceramic capacitor 1 of the present invention as described above is explained below in the order of the production steps.

First, the ceramic laminate 3 is formed. As shown in FIG. 2, using a slurry of the material powders comprising barium titanate; at least one of scandium oxide and yttrium oxide; at least one kind of oxides selected from gadolinium oxide, terbium oxide and dysprosium oxide; at least one of manganese oxide, cobalt oxide and nickel oxide; magnesium oxide; and silicon oxide; a sheet-form dielectric ceramic layer 2 (green sheet) is prepared and an internal electrode 4 made of nickel or a nickel alloy is formed on one surface of the layer 2. In addition, the internal electrode 4 may be formed by a screen printing method a vapor deposition method, or a plating method.

Then, as shown in FIG. 3, a necessary number of the dielectric ceramic layers 2b each having the internal electrode 4 are laminated and sandwiched between dielectric ceramic layers 2a which have no internal electrode 4, followed by pressing to form a laminate. Thereafter, the laminated ceramic layers 2a, 2b, ..., 2b, 2a are calcined in a reducing atmosphere to form a ceramic laminate 3.

Next, two external electrodes 5 are formed at both edge surfaces of the ceramic laminate 3, such that they are connected to the internal electrodes 4.

As the material for the external electrodes 5, the same material as the internal electrodes 4 can be used. Also, silver, palladium, a silver-palladium alloy, copper, a copper alloy, etc., can be also used as the material for the external electrodes and further a material made up of the above-described metal powder with a glass frit such as a $B_2O_3$—$SiO_2$—BaO series glass, an $Li_2O$—$SiO_2$—BaO series glass may be also used as the material for the external electrodes. That is, a proper material is selected according to the envisioned use and the environment of the monolithic ceramic capacitor.

Also, the external electrodes 5 can be formed by coating an electrically conductive paste composed of the metal powder forming the external electrodes on both the edge surfaces of the ceramic laminate 3 obtained by calcining followed by baking but in another method, the electrically conductive paste is coated on both the edge surfaces of the ceramic laminate 3 before calcining and the external electrodes 5 may be formed simultaneously with calcining the ceramic laminate 3. Thereafter, a plating of nickel, copper, etc., is applied to each of the external electrodes 5 to form the first plating layer 6. Finally, the second plating layer 7 of a soft solder, tin, etc., is applied onto the first plating layer 6 to produce the chip-type monolithic ceramic capacitor 1.

The present invention is described in more detail by the following example below.

EXAMPLE 1

First, after preparing and weighing $TiCl_4$ and $Ba(NO_3)_2$ as starting materials, they were treated with oxalic acid to precipitate barium titanyl oxalate ($BaTiO(C_2O_4) \cdot 4H_2O$). The precipitates were decomposed by heating to a temperature of 1,000° C. or higher to provide the four kinds of barium titante ($BaTiO_3$) shown in Table 1 below.

TABLE 1

| Kind of BaTiO₃ | Content of Impurities (wt/%) | | | | | Mean Grain size (μm) |
| | Alkali metal oxide | SrO | CaO | SiO₂ | Al₂O₃ | |
| --- | --- | --- | --- | --- | --- | --- |
| A | 0.003 | 0.012 | 0.001 | 0.010 | 0.005 | 0.60 |
| B | 0.021 | 0.010 | 0.003 | 0.019 | 0.008 | 0.56 |
| C | 0.012 | 0.179 | 0.018 | 0.155 | 0.071 | 0.72 |
| D | 0.065 | 0.014 | 0.001 | 0.019 | 0.004 | 0.58 |

Then, $BaCO_3$ for controlling the Ba/Ti mol ratio m of barium titanate, $Sc_2O_3$, $Y_2O_3$, $Gd_2O_3$, $Tb_2O_3$, $Dy_2O_3$, $MnCO_3$, NiO, $Co_2O_3$, MgO and $SiO_2$ each having a purity of 99% or higher were prepared. These raw material powders were compounded such that each of the component ratios shown in Table 2 below were realized to provide compounded products. In the Tables below, any sample marked with an asterisk (*) is outside the scope of the invention.

TABLE 2

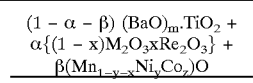

| Sample No. | Kind of BaTiO₃ | α | M | | | Re | | | x | β | β/α | y | z | y + z | m | MgO | SiO₂ |
| | | | Sc | Y | 1 − x | Gd | Tb | Dy | | | | | | | | | |
| --- | --- | --- | --- | --- | --- | --- | --- | --- | --- | --- | --- | --- | --- | --- | --- | --- | --- |
| 1* | A | 0025 | — | 0.80 | 0.80 | — | — | 0.20 | 0.20 | 0.070 | 14/5 | 0.20 | 0.35 | 0.55 | 1.010 | 0.90 | 1.00 |
| 2* | A | 0.015 | — | 0.80 | 0.80 | — | — | 0.20 | 0.20 | 0.045 | 3 | 0.30 | 0.30 | 0.60 | 1.000 | 0.80 | 1.00 |
| 3* | A | 0.013 | — | 0.80 | 0.80 | 0.20 | — | — | 0.20 | — | — | — | — | — | 1.010 | 1.00 | 1.00 |

TABLE 2-continued

| | | | | | | | | | | | | | | | | | |
|---|---|---|---|---|---|---|---|---|---|---|---|---|---|---|---|---|---|
| | $(1 - \alpha - \beta)(BaO)_m \cdot TiO_2 + \alpha\{(1 - x)M_2O_3 x Re_2O_3\} + \beta(Mn_{1-y-z}Ni_yCo_z)O$ |

| Sample No. | Kind of BaTiO$_3$ | $\alpha$ | M | | | Re | | | | | | | | | | | |
|---|---|---|---|---|---|---|---|---|---|---|---|---|---|---|---|---|---|
| | | | Sc | Y | 1 − x | Gd | Tb | Dy | x | $\beta$ | $\beta/\alpha$ | y | z | y + z | m | MgO | SiO$_2$ |
| 4* | A | 0.005 | — | 0.65 | 0.65 | — | 0.15 | 0.20 | 0.35 | 0.030 | 6 | 0.15 | 0.15 | 0.30 | 1.010 | 1.00 | 1.10 |
| 5* | A | 0.020 | 0.70 | — | 0.70 | — | — | 0.30 | 0.30 | 0.030 | 3/2 | 0.10 | 0.10 | 0.20 | 1.010 | 0.25 | 1.20 |
| 6* | A | 0.015 | — | 0.70 | 0.70 | — | — | 0.30 | 0.30 | 0.030 | 2 | 0.25 | 0.20 | 0.45 | 0.990 | 1.00 | 1.00 |
| 7* | A | 0.015 | — | 1.00 | 1.00 | — | — | — | — | 0.030 | 2 | 0.20 | 0.20 | 0.40 | 1.000 | 0.90 | 1.00 |
| 8* | A | 0.015 | — | 0.70 | 0.70 | 0.30 | — | — | 0.30 | 0.030 | 2 | 0.30 | 0.20 | 0.50 | 1.010 | 7.50 | 1.00 |
| 9 | A | 0.0025 | 0.40 | 0.30 | 0.70 | — | 0.30 | — | 0.30 | 0.005 | 2 | 0.50 | 0.20 | 0.70 | 1.005 | 0.50 | 0.20 |
| 10 | B | 0.015 | 0.80 | — | 0.80 | — | — | 0.20 | 0.20 | 0.030 | 2 | 0.40 | 0.20 | 0.60 | 1.010 | 1.00 | 1.00 |
| 11 | A | 0.015 | — | 0.50 | 0.50 | 0.25 | 0.25 | — | 0.50 | 0.021 | 7/5 | 0.30 | 0.30 | 0.60 | 1.010 | 1.00 | 1.20 |
| 12 | C | 0.015 | — | 0.80 | 0.80 | — | — | 0.20 | 0.20 | 0.030 | 2 | 0.35 | 0.20 | 0.55 | 1.010 | 0.90 | 1.00 |
| 13 | A | 0.010 | — | 0.65 | 0.65 | 0.35 | — | — | 0.35 | 0.010 | 1 | 0.10 | 0.20 | 0.30 | 1.008 | 4.00 | 1.00 |
| 14 | A | 0.007 | — | 0.75 | 0.75 | 0.15 | — | 0.10 | 0.25 | 0.014 | 2 | 0.30 | 0.20 | 0.50 | 1.015 | 0.30 | 1.00 |
| 15 | A | 0.020 | — | 0.70 | 0.70 | — | 0.10 | 0.20 | 0.30 | 0.010 | 1/2 | 0.45 | 0.25 | 0.70 | 1.030 | 1.50 | 3.50 |
| 16 | A | 0.025 | — | 0.60 | 0.60 | — | — | 0.40 | 0.40 | 0.050 | 2 | 0.30 | 0.25 | 0.55 | 1.010 | 1.20 | 1.50 |
| 17 | A | 0.020 | — | 0.75 | 0.75 | 0.05 | 0.05 | 0.15 | 0.25 | 0.050 | 512 | 0.10 | 0.20 | 0.30 | 1.015 | 1.00 | 0.90 |
| 18* | A | 0.030 | — | 0.75 | 0.75 | — | — | 0.25 | 0.25 | 0.045 | 3/2 | 0.10 | 0.10 | 0.20 | 1.010 | 0.90 | 1.20 |
| 19* | A | 0.015 | 0.40 | 0.40 | 0.80 | — | — | 0.20 | 0.20 | 0.030 | 2 | 0.40 | 0.25 | 0.65 | 1.050 | 1.00 | 1.20 |
| 20* | A | 0.010 | — | 0.70 | 0.70 | — | 0.30 | — | 0.30 | 0.020 | 2 | 0.50 | 0.20 | 0.70 | 1.005 | 1.00 | 6.00 |
| 21* | A | — | — | — | — | — | — | — | — | 0.028 | — | 0.09 | 0.31 | 0.40 | 1.013 | 0.90 | 1.00 |
| 22* | A | 0.015 | — | 0.20 | 0.20 | — | 0.80 | — | 0.80 | 0.021 | 7/5 | 0.15 | 0.30 | 0.45 | 1.010 | 1.00 | 1.00 |
| 23* | A | 0.010 | 0.20 | 0.60 | 0.80 | — | — | 0.20 | 0.20 | 0.020 | 2 | 0.25 | 0.25 | 0.50 | 1.010 | 1.00 | 0.05 |
| 24* | A | 0.015 | — | 0.75 | 0.75 | — | 0.25 | — | 0.25 | 0.030 | 2 | — | 1.00 | 1.00 | 1.010 | 1.00 | 1.00 |
| 25* | A | 0.005 | 0.20 | 0.60 | 0.80 | — | — | 0.20 | 0.20 | 0.015 | 3 | 1.00 | — | 1.00 | 1.010 | 1.00 | 1.00 |
| 26* | A | 0.010 | — | 0.70 | 0.70 | — | — | 0.30 | 0.30 | 0.015 | 3/2 | 0.50 | 0.50 | 1.00 | 1.010 | 0.80 | 1.20 |
| 27* | D | 0.015 | — | 0.75 | 0.75 | 0.25 | — | — | 0.25 | 0.030 | 2 | 0.30 | 0.40 | 0.70 | 1.015 | 1.00 | 1.00 |

To each of the compounded products thus obtained were added a polyvinyl butyral series binder and an organic solvent such as ethanol, etc., and the mixture was wet blended in a ball mill to prepare a ceramic slurry. Thereafter, the ceramic slurry was formed into a sheet by the doctor blade method to provide a rectangular green sheet having a thickness of 11 μm. Then, an electrically conductive paste containing Ni as the principal component was printed on the above-described ceramic green sheet to form an electrically conductive layer for constituting an internal electrode.

The plural ceramic green sheets each having formed thereon the electrically conductive paste layer, one side of which protruded from one side of the sheet, were prepared. These plural ceramic green sheets were laminated such that the protruded sides of the electrically conductive paste layers alternated to provide a laminate. After burning the binder by heating the laminate obtained to a temperature of 350° C. in a nitrogen gas atmosphere, the laminate was calcined in a reducing atmosphere of an $H_2$—$N_2$—$H_2O$ gas at an oxygen partial pressure of from $10^{-9}$ to $10^{-12}$ MPa for 2 hours at a temperature shown in Table 3 below to provide a ceramic sintered material.

The surface of the ceramic sintered material obtained was observed by a scanning electron microscope at a magnification of 1,500 and grain sizes were measured.

After calcining, a silver paste containing a $B_2O_3$—$Li_2O$—$SiO_2$—BaO series glass frit was coated on both of the edge surfaces of the sintered material obtained and baked in a nitrogen gas atmosphere at a temperature of 600° C. to form external electrodes electrically connected to the internal electrodes alternately.

The size of the external form of the monolithic ceramic capacitor obtained as described above was a width of 1.6 mm, length of 3.2 mm and thickness of 1.2 mm. Also, the thickness of each dielectric ceramic layer disposed between the internal electrodes was 8 μm. The total number of the effective dielectric ceramic layers was 19 and the area of the counter electrode per layer was 2.1 mm$^2$.

The electric characteristics of these monolithic ceramic capacitors obtained were measured. The electrostatic capacity (C) and the dielectric loss (tan δ) were measured using an automatic bridge-type measuring apparatus at a frequency of 1 kHz, 1 Vrms and a temperature of 25° C., and also the dielectric constant (ε) was calculated from the electrostatic capacity.

Then, to measure the insulating resistance (R), the insulating resistance (R) at 25° C. was measured using an insulating resistance meter by applying a direct current voltage of 16 V for 2 minutes, and the product of the electrostatic capacity (C) and the insulating resistances (R), that is, the CR product, was obtained.

Furthermore, the changing ratios of the electrostatic capacity to a temperature change was measured. In particular, the changing ratio at −25° C. and 85° C. relative to the electrostatic capacity at 20° C. as the standard (ΔC/C20° C.), the changing ratio at −55° C. and 125° C. relative to the electrostatic capacity at 25° C. as the standard (ΔC/C25° C.), and the value that the changing ratio was maximum as absolute value within the range of from −55° C. to 125° C. (|ΔC/C25° C.|max) were obtained.

A high-temperature loading life test was performed in which 36 samples were prepared in each case and the change of the insulating resistance of each of the samples was measured at a temperature of 150° C. by applying a direct current voltage of 100 V. The time at which the insulating resistance value (R) of each sample became 10$^6$Ω or lower was defined as the life time and the average life time of the life times of all the samples was determined.

In the moisture loading test, 72 samples were prepared in each case and when a direct current voltage of 16 V was applied to these samples at 2 atms (relative humidity 100%) and at a temperature of 121° C., the number of the samples whose insulating resistance values (R) became $10^6 \Omega$ or lower before 250 hours was determined.

The results of the above-described tests are shown in Table 3 below.

and $Y_2O_3$; and $Re_2O_3$ is at least one of $Gd_2O_3$, $Tb_2O_3$ and $Dy_2O_3$), $\alpha, \beta$, m, x, y, and z are defined as described above in the present invention and this is because When the amount $\alpha$ of $(M_2O_3+Re_2O_3)$ is less than about 0.0025 as in Sample No. 21, the dielectric constant is lower than 3,000, the dielectric loss exceeds 2.5%, the temperature

TABLE 3

| Sample No. | Calcining Temperature ° C. | Dielectric Constant ε | Dielectric Loss Tan δ % | Capacity Temperature Changing Ratio % | | | | CR Product (16V) MΩ · μF max | Average Life Time 25° C. hr | Moisture Loading Test | Grain Size μm |
|---|---|---|---|---|---|---|---|---|---|---|---|
| | | | | ΔC/C20° C. | | ΔC/C25° C. | | | | | |
| | | | | −25° C. | 85° C. | −55° C. | 125° C. | | | | |
| 1* | 1300 | 3020 | 2.0 | 0.1 | −9.8 | −0.7 | −16.4 | 16.4 | 5780 | 61 | 0/72 | 0.70 |
| 2* | 1300 | 3180 | 2.1 | −0.2 | −9.9 | −0.7 | −11.0 | 11.0 | 4380 | 112 | 0/72 | 0.70 |
| 3* | 1300 | | | Impossible to measure because of becoming semiconductor | | | | | | | 2.60 |
| 4* | 1280 | 3490 | 2.3 | 1.1 | −12.8 | 1.0 | −18.5 | 18.5 | 6080 | 282 | 0/72 | 0.72 |
| 5* | 1300 | 3280 | 2.0 | 0.7 | −13.1 | 0.7 | −17.0 | 17.0 | 5510 | 331 | 0/72 | 0.69 |
| 6* | 1300 | | | Impossible to measure because of becoming semiconductor | | | | | | | 2.30 |
| 7* | 1300 | 3220 | 2.2 | 0.0 | −6.2 | −1.0 | −9.8 | 9.8 | 6940 | 271 | 0/72 | 0.72 |
| 8* | 1360 | 2350 | 1.0 | −0.1 | −3.1 | −0.8 | −8.1 | 8.1 | 5130 | 338 | 41/72 | 0.70 |
| 9 | 1340 | 3080 | 2.3 | 0.0 | −3.0 | −2.5 | −12.0 | 12.0 | 6040 | 315 | 0/72 | 0.69 |
| 10 | 1300 | 3110 | 2.0 | −0.2 | −2.4 | −1.0 | −7.1 | 7.1 | 6740 | 390 | 0/72 | 0.65 |
| 11 | 1280 | 3120 | 2.2 | −0.8 | −3.8 | 1.9 | −9.5 | 9.5 | 6330 | 422 | 0/72 | 0.69 |
| 12 | 1300 | 3310 | 2.2 | −0.2 | −2.6 | −1.1 | −8.6 | 8.6 | 6920 | 377 | 0/72 | 0.75 |
| 13 | 1340 | 3340 | 2.3 | −0.2 | −2.0 | −1.0 | −10.0 | 10.0 | 6880 | 410 | 0/72 | 0.72 |
| 14 | 1300 | 3430 | 2.3 | −0.1 | −2.2 | −1.5 | −11.0 | 11.0 | 6420 | 346 | 0/72 | 0.71 |
| 15 | 1220 | 3050 | 2.1 | −1.1 | −4.0 | −2.5 | −13.0 | 13.0 | 6050 | 323 | 0/72 | 0.71 |
| 16 | 1300 | 3040 | 2.1 | −0.2 | −2.4 | −2.1 | −9.0 | 9.0 | 6080 | 311 | 0/72 | 0.70 |
| 17 | 1300 | 3060 | 2.0 | 0.0 | −3.0 | −2.0 | −11.0 | 11.0 | 6110 | 310 | 0/72 | 0.70 |
| 18* | 1300 | 2200 | 1.9 | 0.0 | −6.5 | −1.0 | −10.0 | 10.0 | 4910 | 270 | 14/72 | 0.72 |
| 19* | 1360 | | | Impossible to measure because of insufficient sintering | | | | | | | 0.61 |
| 20* | 1200 | 2230 | 1.1 | −2.2 | −11.1 | −3.0 | −18.3 | 18.3 | 4980 | 390 | 0/72 | 0.72 |
| 21* | 1300 | 2720 | 2.9 | −5.2 | 18.0 | −9.9 | −13.0 | 13.0 | 8010 | 4 | 0/72 | 0.76 |
| 22* | 1300 | 3290 | 2.0 | 1.6 | −15.5 | 1.0 | −17.0 | 17.0 | 6680 | 390 | 0/72 | 0.70 |
| 23* | 1360 | | | Impossible to measure because of insufficient sintering | | | | | | | 0.60 |
| 24* | 1280 | 3210 | 1.9 | 0.1 | −9.4 | −0.8 | −11.5 | 11.5 | 4400 | 162 | 0/72 | 0.71 |
| 25* | 1320 | 3130 | 1.7 | −0.2 | −8.8 | −1.9 | −11.6 | 11.6 | 4660 | 192 | 0/72 | 0.71 |
| 26* | 1280 | 3250 | 2.1 | −0.3 | −9.0 | −0.8 | −10.6 | 10.6 | 4120 | 176 | 0/72 | 0.69 |
| 27* | 1300 | 2310 | 1.2 | 0.2 | −5.5 | 0.6 | −5.9 | 5.9 | 6220 | 367 | 0/72 | 0.72 |

As is clear from Tables 1 to 3, it can be seen that in the monolithic ceramic capacitors of the present invention, the dielectric constant is as high as 3,000 or higher, the dielectric loss is 2.5% or lower, and the changing ratio of the electrostatic capacity to temperature satisfies the B characteristic. standard prescribed by the JIS standard in the range of from −25° C. to 85° C. and satisfies the X7R characteristic standard prescribed by the EIA standard in the range of from −55° C. to 125° C.

Also, as shown in these tables, the monolithic ceramic capacitors of the present invention have the following advantages.

That is, when the insulating resistance at 25° C. is shown by the CR product, it as a high value as 6,000 MΩ•μF or higher.

The average life time is as long as 300 hours or longer and also the occurrence of inferior results in the moisture loading test is not observed.

Furthermore, the calcining temperature is 1,300° C. or lower and sintering can be carried out at a relatively low temperature. Also, the grain sizes are small as 1 μm or less.

The reasons for limiting the composition of the dielectric ceramic materials used for the monolithic ceramic capacitors of the present invention are explained below.

In $(1-\alpha-\beta)\{BaO\}_m \cdot TiO_2 + \alpha\{(1-x)M_2O_3+xRe_2O_3\} + \beta (Mn_{1-y-z}Ni_yCo_z)O$ (wherein $M_2O_3$ is at least one of $Sc_2O_3$ changing ratio of the electrostatic capacity becomes large and the average life time is extremely shortened.

When the amount $\alpha$ of $(M_2O_3+Re_2O_3)$ exceeds about 0.025 as in Sample No. 18, the dielectric constant is lower than 3,000, the insulating resistance is lowered, the average life time is short, inferior results occur in the moisture loading test and the sintering temperature becomes high.

When the amount $\beta$ of (Mn, Ni, Co)O is less than about 0.0025 as in Sample No. 3, the dielectric ceramic calcined in a reducing atmosphere is reduced to become a semiconductor-like material and the insulating resistance is lowered.

When the amount $\beta$ of (Mn, Ni, Co)O exceeds about 0.05 as in Sample No. 1, the insulating resistance is lowered, the average life time is shortened and the temperature changing ratio of the electrostatic capacity becomes large.

When the dielectric ceramic material does not contain any Mn as in Sample Nos. 24, 25 and 26, the insulating resistance is lowered and the average life time becomes shorter than 300 hours.

When the amount x of $\{(1-x)M_2O_3+xRe_2O_3\}$ is 0 as in Sample No. 7, the average life time becomes shorter than 300 hours.

When the amount x of $\{(1-x)M_2O_3+xRe_2O_3\}$ exceeds about 0.0075 as in Sample No. 22, the temperature changing ratio of the electrostatic capacity becomes large and does not satisfy the B characteristics of the JIS standard or the X7R characteristics of the EIA standard.

When the ratio $\beta/\alpha$ of the amount $\beta$ of (Mn, Ni, Co)O to the amount $\alpha$ of $(M_2O_3+Re_2O_3)O$ exceeds about 4 as in Sample No. 4, the temperature changing ratio of the electrostatic capacity becomes large and the average life time becomes shorter than 300 hours.

When the molar ratio m of barium titanate is about 1,000 or lower as in Sample Nos. 2 and 6, the dielectric ceramics become semiconductor-like materials when calcined in a reducing atmosphere and the average life time becomes shorter than 300 hours.

When the molar ratio m of barium titanate exceeds about 1.035 as in Sample No. 19, the sintering property is extremely reduced.

When the amount of MgO is less than about 0.5 mol as in Sample No. 5, the insulating resistance is lowered and the temperature changing ratio of the electrostatic capacity becomes large.

When the amount of MgO exceeds about 5.0 mols as in Sample No. 8, the sintering temperature becomes high and inferior results occur in the moisture loading test.

When the amount of $SiO_2$, is less than about 0.2 mol as in Sample No. 23, the sintering property becomes extremely inferior.

When the amount of $SiO_2$ exceeds about 5.0 mols as in Sample No. 20, the dielectric constant becomes lower than 3,000 and the insulating resistance does not exceed 6,000 $M\Omega \cdot \mu F$.

When the amount of alkali metal oxides contained in barium titanate as impurities exceeds about 0.02 part by weight as in Sample No. 27, the dielectric constant is lowered.

In the above-described examples, a barium titanate powder prepared by an oxalic acid method was used but the barium titanate used in the present invention is not limited to that barium titanate powder and a barium titanate powder prepared by an alkoxide method or a hydrothermal synthesis method may be used in the present invention. By using the latter barium titanate powder, it may be possible that more improved characteristics than those of the examples described above are obtained.

Also, as scandium oxide, yttrium oxide, gadolinium oxide, terbium oxide, dysprosium oxide, manganese oxide, cobalt oxide, nickel oxide, and magnesium oxide were used in the above-described examples but these oxides are not limited to these powders, and when the oxides are compounded such that they constitute the dielectric ceramic layer of the component range defined in the present invention, by using a solution of alkoxides, organic metals, etc., the characteristics obtained are not spoiled.

Because the monolithic ceramic capacitor of the present invention is composed of a dielectric ceramic material which is not reduced even by calcining in a reducing atmosphere and does not become a semiconductor-like material, nickel, which is a base. metal, or a nickel alloy can be used as the electrode material, the dielectric ceramic material can be calcined at a relatively low temperature as 1,300° C. or lower and the cost for the monolithic ceramic capacitor can be reduced.

In the monolithic ceramic capacitor using the dielectric ceramic material, the dielectric constant is 3,000 or higher and the temperature change of the dielectric constant is small.

Furthermore, the monolithic ceramic capacitor of the present invention has a high insulating resistance and shows excellent characteristics without deterioration of the characteristics under high temperature and high humidity. Accordingly, when the dielectric ceramic layers are thinned, it is unnecessary to lower the rated voltage.

Moreover, because the crystal grain sizes are as small as 1 $\mu$m or lower in the present invention, when the dielectric ceramic layers are thinned, the number of the crystal grains existing in each layer can be increased as compared with conventional monolithic ceramic capacitors, whereby a small-sized and large capacity monolithic ceramic capacitor having high reliability can be obtained.

While the invention has been described in detail and with reference to specific embodiments thereof, it will be apparent to one skilled in the art that various changes and modifications can be made therein without departing from the spirit and scope thereof.

What is claimed is:

1. A monolithic ceramic capacitor comprising:

a plurality of dielectric layers and internal electrodes each of which is disposed between adjacent dielectric ceramic layers, wherein said dielectric ceramic layers comprise:

barium titanate containing alkali metal oxides impurities in an amount of not more than about 0.02% by weight, at least one oxide selected from scandium oxide and yttrium oxide, at least one oxide selected from gadolinium oxides terbium oxide and dysprosium oxide, and at least one mixed oxide of manganese, cobalt and nickel, magnesium oxide in an amount of from about 0.3 to 5.0 mols as MgO and silicon oxide in an amount of from about 0.2 to 5.0 mols as $SiO_2$ per 100 mols of a principal component represented by the following component formula:

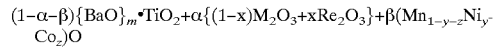

$(1-\alpha-\beta)\{BaO\}_m \cdot TiO_2 + \alpha\{(1-x)M_2O_3 + xRe_2O_3\} + \beta(Mn_{1-y-z}Ni_y Co_z)O$ wherein $[M_2O_3]$ M is at least one of Sc $[Sc_2O_3]$ and Y $[Y_2O_3]$; Re $[Re_2O_3]$ is at least one of Gd $[Gd_2O_3]$, Tb $[Tb_2O_3]$ and Dy $[Dy_2O_3]$;

$0.0025 \leq \alpha \leq 0.025$, $0.0025 \leq \beta \leq 0.05$, $\beta/\alpha \leq 4$, $0 < x \leq 0.50$, $0 \leq y < 1.0$, $0 \leq z < 1.0$, $0 \leq y+z < 1.0$, and $1.000 < m \leq 1.035$.

2. The monolithic ceramic capacitor of claim 1, wherein said internal electrodes comprise nickel or a nickel alloy.

3. The monolithic ceramic capacitor of claim 1 further having two external electrodes connected to different internal electrodes, said external electrodes comprise a sintered layer of an electrically conductive metal or an electrically conductive metal and glass frit.

4. The monolithic ceramic capacitor of claim 3, wherein said external electrodes comprise a first layer of sintered electrically conductive power or electrically conductive power and glass frit and a second plating layer on the first layer.

5. The monolithic ceramic capacitor of claim 1, wherein the impurity is less than about 0.012%, $0.007 \leq \alpha \leq 0.02$, $0.005 \leq \beta \leq 0.03$, $\beta/\alpha \leq 2.5$, $0.2 \leq x \leq 0.4$, $0.1 \leq y \leq 5$ 0.5, 0.2≦z≦0.3, 0.3≦y+z ≦0.7, and 1.005≦m≦1.03, and the number of mols of MgO and SiO$_2$ per 100 are about 0.5–4 and 0.9–3.5, respectively.

6. The monolithic ceramic capacitor of claim 5, wherein said internal electrodes comprise nickel or a nickel alloy.

7. The monolithic ceramic capacitor of claim 6 further having two external electrodes connected to different internal electrodes, said external electrodes comprise a sintered layer of an electrically conductive metal or an electrically conductive metal and glass frit.

8. The monolithic ceramic capacitor of claim 7, wherein said external electrodes comprise a first layer of sintered electrically conductive power or electrically conductive powder and glass frit and a second plating layer on the first layer.

9. The monolithic ceramic capacitor of claim 5, wherein M comprises Y and Re comprises Dy.

10. The monolithic ceramic capacitor of claim 1 further having two external electrodes connected to different internal electrodes, said external electrodes comprise a sintered layer of an electrically conductive metal or an electrically conductive metal and glass frit.

11. The monolithic ceramic capacitor of claim 10, wherein said external electrodes comprise a first layer of sintered electrically conductive power or electrically conductive power and glass frit and a second plating layer on the first layer.

12. A dielectric ceramic material comprising:
    barium titanate containing alkali metal oxides impurities in an amount of not more than about 0.02% by weight;
    at least one oxide selected from scandium oxide and yttrium oxide;
    at least one oxide selected from gadolinium oxide, terbium oxide and dysprosium oxide;
    at least one mixed oxide of manganese, cobalt and nickel;
    magnesium oxide in an amount of from about 0.3 to 5.0 mols as MgO and silicon oxide in an amount of from about 0.2 to 5.0 mols as SiO$_2$ per 100 mols of a principal component represented by the following component formula:

$$(1-\alpha-\beta)\{BaO\}_m \cdot TiO_2 + \alpha\{(1-x)M_2O_3 + xRe_2O_3\} + \beta(Mn_{1-y-z}Ni_yCo_z)O$$

wherein M [M$_2$O$_3$] is at least one of Sc [Sc$_2$O$_3$] and Y [Y$_2$O$_3$]; Re [Re$_2$O$_3$] is at least one of Gd [Gd$_2$O$_3$], Tb [Tb$_2$O$_3$] and Dy [Dy$_2$O$_3$];

0.0025≦α≦0.025, 0.0025≦β≦0.05,

β/α≦4,

0<x≦0.50,

0≦y<1.0,

0≦z<1.0,

0≦y+z<1.0, and 1.000<m≦1.035.

13. The dielectric ceramic material of claim 12, wherein the impurity is less than about 0.012%, 0.007≦α≦0.02, 0.005≦β≦0.03, β/α≦2.5, 0.2≦x≦0.4, 0.1≦y≦0.5, 0.2≦z≦0.3, 0.3≦y+z ≦0.7, and 1.005≦m≦1.03, and the number of mols of MgO and SiO$_2$ per 100 are about 0.5–4 and 0.9–3.5, respectively.

14. The dielectric ceramic material of claim 13, wherein M comprises Y and Re comprises Dy.

15. The dielectric ceramic material of claim 12, wherein M comprises Y and Re comprises Dy.

* * * * *